United States Patent [19]
Chanowitz

[11] 3,795,786
[45] Mar. 5, 1974

[54] METHOD OF TUNGSTEN INERT GAS WELDING ELECTRONIC COMPONENTS AND BURNING AWAY CONTAMINANTS

[75] Inventor: Harry Chanowitz, Skokie, Ill.

[73] Assignee: Pico-Matic, Inc., Chicago, Ill.

[22] Filed: June 5, 1972

[21] Appl. No.: 259,841

Related U.S. Application Data

[63] Continuation-in-part of Ser. No. 115,177, Feb. 16, 1971, abandoned.

[52] U.S. Cl.................. 219/137, 29/628, 219/121, 219/131
[51] Int. Cl................................................ B23k 9/00
[58] Field of Search..... 219/131, 137, 121, 127, 75; 338/329, 332, 266; 29/628, 630 G

[56] References Cited
UNITED STATES PATENTS

| | | | |
|---|---|---|---|
| 1,605,860 | 11/1926 | Snelling | 219/137 |
| 903,860 | 11/1908 | Howell | 219/121 |
| 3,634,649 | 11/1972 | Rager | 219/137 |

OTHER PUBLICATIONS

International Electronic Circuit Packaging Symposium, M. J. Davis, 8/69, pp. 1–7.

*Primary Examiner*—J. V. Truhe
*Assistant Examiner*—George A. Montanye

[57] ABSTRACT

A method and apparatus wherein linear metallic elements such as copper wire leads are welded to workpieces, such as terminal lugs of electrical and electronic components. An electric arc welding method is used to produce an electrical or electronic component with copper wire leads rigidly and reliably attached, without requiring prior cleaning of the terminal lugs of the component. In the welding step a surplus of heat energy greater than that necessary to melt and coalesce the weld material is applied to the welding zone in order to burn away contaminents at the area to be welded.

6 Claims, 8 Drawing Figures

METHOD OF TUNGSTEN INERT GAS WELDING ELECTRONIC COMPONENTS AND BURNING AWAY CONTAMINANTS

BACKGROUND OF THE INVENTION

This application is a continuation-in-part of copending application Ser. No. 115,177 filed Feb. 16, 1971 now abandoned.

This invention relates generally to bonding, and more particularly, to the use of a novel welding process to produce a bond between linear metallic elements such as wire conductor leads composed of pure or electrolytic copper, and workpieces such as the terminal lugs of electrical and electronic components. The unique welding method which forms a part of my invention may also be used to bond heretofore non-weldable or difficultly welded elements of various types.

In the manufacture and use of electrical and electronic equipment, the conduction and flow of electric energy from one component to another is accomplished by the use of conductor leads connected to the components. For various reasons, of which efficiency of electrical conductivity and economy of production are primary, copper has been accepted by the electrical/electronic industry as the standard for a conductor. It is also acknowledged by the electrical/electronic industry that a welded connection between conductor leads and electric components is both electrically and metallurgically more sound, as contrasted to soldered or mechanical connections, or combinations thereof.

The mechanical bond frequently used to attach a lead to a terminal lug consists of an eyelet-rivet connection, where dirt and corrosion can build up between the interface of the lead and the terminal lug. This provides an electrically unstable and undesirable connection due to contact resistance, which has an increasingly cumulative effect. The heat produced at the interface between lead and terminal lug causes a film of oxidation to form, which increases the electrical resistivity of the bond. This, in turn, causes more heat, additional oxidation, and so on until the component fails or burns out.

Soldered connections provide a more stable bond electrically. However, the bond produced is not as mechanically strong as a welded bond, due to the absence of intergranular dipersion between one metal and another (coalescence) in a soldered bond. A soldered connection is limited in mechanical strength by the ultimate strength of the solder, which is less than that of the raw material of the elements being joined. Also, as in mechanical lead-component connections, the surfaces to be soldered must be cleaned and fluxed prior to bonding. A mechanical attachment usually supplements a solder joint in order to give the bond additional strength. This naturally results in increased cost and size.

A welded connection, on the other hand, provides a mechanically, electrically and metallurgically superior bond which, when using the arc welding process of the present invention, does not require the prior step of cleaning or fluxing parts. Also, a welded joint derives its strength from the ultimate stress of the base metals or of the weld alloy, which stress point is considerably higher than that of solder.

Despite the desirability of a welded pure or electrolytic copper connection, no high quality and economically feasible electrical or electronic components manufactured in this manner are available on today's market. While the most desirable material from which to fabricate a lead wire is copper, pure or electrolytic copper cannot be readily welded to terminal lugs of electrical components by methods known to the prior art. As a consequence, manufacturers who supply electrical or electronic components with welded leads have resorted to using a copper alloy, such as six per cent nickel (nominal analysis), as a lead material. Others use copper-clad, iron core lead wires in producing welded lead components. In those few instances where copper leads are attached to components by welding, the joint is usually of inferior mechanical quality due to the resistance welding method used, or other problems and the configuration as to how the wire is attached is restricted by today's art.

The process most frequently employed at present is to weld one part to another in the fabrication of electrical and electronic components is know as resistance welding. This encompasses several methods wherein coalescence of the interface between surfaces to be welded is produced by he heat generated by the resistance of the work to the flow of electric current in a circuit of which the work is a part. The resistance welding process is also accompanied by the publication of pressure to the bonded junction. Included among the resistance welding method are spot, flash, upset and percussion welding.

Resistance spot welding is applied to a lap joint of two mating workpieces wherein coalescence occurs at a spot on the mating surfaces directly beneath where the surfaces are held together under pressure applied by two electrodes. Electric current passing between the electrodes produces heat in the joint due to the resistivity of the material to be welded, and contact resistance of the materials, and this heat causes the surfaces to be welded together. The electrode material is usually a high copper bearing alloy, or else a high tungsten alloy. Copper or copper bearing alloys are used due to their low electrical resistivity and high heat conductivity, which keeps the heat generated at the electrode-material interface to a minimum to prevent the electrodes from becoming fused or stuck to the materials. For these same reasons, it is quite difficult to produce a spot welded joint if one of the materials to be welded is copper.

Tungsten or tungsten-bearing alloys have been used as electrodes with limited success in the resistance spot welding of copper. The relatively high electrical resistivity of the tungsten electrode and its low heat conductivity aid in generating heat for the welding of copper by acting as a heat source rather than as a heat sink. Sticking does not occur at the copper-tungsten interface because of the extremely high melting point of tungsten (approximately 6,400°F.). However, the heat balance that must be maintained is critical, and consequently the process is marginal. In fact, this process is usually limited to the welding of braided or stranded copper wire, as opposed to solid wire, where the heat due to the contact resistance at the many points of contact is sufficient to produce a weld. The quality of the joint is inferior since the number of strands that are welded is unpredictable, and since the electrode pressure mars the wire to the extent that its strength is considerably reduced. Accordingly, the resistance spot welding of copper wire is almost always accompanied by some means of mechanical attachment of the copper wire to the terminal in order to protect the welded joint from mechanical stress.

Copper wires have also been welded successfully by the flash and upset resistance welding processes. Coalescence is produced over the entire area of abutting surfaces by the heat obtained from resistance to the flow of electric current between the two surfaces. In flash welding, pressure is applied after heating is substantially completed. Upset welding is accomplished by applying pressure before heating and maintaining the pressure during the heating period. In each process the copper wire is held in a clamping electrode which is placed at some distance from the weld junction. Electric current passes through the wire and the junction, generating heat for the weld. The amount of heat developed is a function of the length of wire extending beyond the clamp. By varying this length, the proper amount of heat can be developed by the electric current passing through the wire.

The flash and upset resistance welding processes are limited to use with solid wire rather than braided or stranded wire. The latter wires are too flexible to withstand the compressive stress resulting from the application of pressure required to keep the wire in contact with the base surface. Further, the flash and upset processes impose configuration limitations due to the fact that the wire must be normal to the base surface. Also, critical to the quality of the weld formed by these methods is the cleanliness of the surfaces to be welded. This necessitates the extra step of cleaning the surfaces prior to welding, a step which is eliminated in the welding procedure which is the subject of the present invention.

The welding of copper wires to base elements has also previously been performed by percussion welding, which is a resistance welding process. The wire and base element are connected to suitable arc welding apparatus such that the wire and base both form part of the electrical circuit of the welding apparatus. An arc is struck between the wire and base, with force percussively applied during or immediately following the electrical discharge. Coalescence results at the point of abutment by the heat obtained from the arc, which is produced by the rapid discharge of electrical energy, and is extinguished by pressure percussively applied by urging the electrode (wire) toward the junction during discharge. The configuration of the joint is a butt weld, similar to that obtained in flash or upset welding, but differs from those processes in the use of an electrical arc to produce the weld.

Percussive welds are less vulnerable than flash or upset welds to the effects of contaminated surfaces. However, the pressure applied to the electrode in percussion welding results in considerable spewing and expulsion of molten metal. A further disadvantage of adapting percussion welding techniques to the fabrication of electrical and electronic components with copper wire leads attached is that an arc must be drawn from the terminal to the wire, which requires an electrical connection to be made to the terminal. This, plus the fact that pressure must constantly be applied to the junction, means that an appreciable amount of terminal lug must be present upon which to attach the wire. Most electrical components are relatively small in size, and the terminal lugs of these components are not large enough to produce good percussive welded joints.

The above described processes have previously been used to weld lead wires to electrical components, and generally to weld copper. However, when an effort is made to use these processes to weld copper wire leads to electric and electronic components, several design limitations have thwarted the success of these efforts. The small size of a terminal lug, its composition, and the configuration of the joint have, prior to my invention, been factors in forcing design engineers to find alternate means of attaching copper leads to electrical and electronic components. Also, in using these known processes, the surfaces to be welded must be immaculately or reasonably clean prior to welding, the degree of cleanliness depending upon the process used. The surfaces to be welded must also be accessible to welding electrodes for the conduction of current during welding, and be able to be attached to a source of pressure. Because of these limitations, copper substitutes or alloyed copper are used in the vast majority of commercially available electrical components comprising a welded lead wire attached to the terminals.

Having thus described the state of the art, of which the present invention represents a significant step forward, it is a principal object of my invention to provide a method of attaching a copper wire lead to a workpiece, such as the terminal lug of an electrical or electronic component, which method circumvents the limitations encountered in the known resistance welding methods.

It is a further object of the present invention to provide a procedure for affixing copper wire leads to the terminals of electrical and electronic components by the process of electric arc welding, wherein the electric arc produces coalescence between the copper wire lead and the terminal. Another object is to provide a method of welding copper wire leads to the terminals of electrical and electronic components, which method avoids the step of cleaning the terminals prior to attaching the lead wire. It has been discovered that a copper lead wire may be firmly welded to a terminal lug through heavy oxide and other contaminants which have to be removed when soldering.

An additional object of the present invention is to provide an electrical or electronic component with copper wire leads arc welded to the terminals of the component.

Another object of my invention is to produce an electrical or electronic component which is not limited in temperature applications to the softening point of solder.

Another object of the present invention is to provide a novel welding procedure for attaching linear metallic elements to workpieces.

A further object of the present invention is to provide an apparatus for welding copper leads to terminals of electrical components by utilizing an electric arc in an inert gas atmosphere to produce coalescence between the lead and the terminal.

Other objects and advantages of my invention will become apparent from the description of the invention in the following specification.

To fully understand the invention, reference should be made to the accompanying drawing, forming part of the specification, in which.

While the drawing shows the preferred forms of my invention, it should be understood that various changes, or modifications, may be made within the scope of the appended claims without departing from the spirit of my invention.

DESCRIPTION OF THE INVENTION

The present invention relates to the electric arc welding of wire leads, preferably of copper, to workpieces such as terminal elements or lugs of electrical and electronic components. In particular, an inert gas tungsten-arc welding procedure is employed wherein coalescence between the copper wire lead and the terminal is produced by heating the junction of the wire with an electric arc formed between the terminus portion of the copper wire and a non-consumable, tungsten tip forming part of a welding electrode. The arc is shielded by an atmosphere of inert gas, such as argon, formed around the junction and the arc. In the trade, this welding process is commonly known as TIG welding (Tungsten Inert Gas).

Specifically, I will describe my invention as applied to the attachment of solid, stranded or braided copper wires to the terminals of vitreous enameled resistors. It is to be understood, however, that my invention may be utilized to attach copper or other metallic wire leads to terminals of other components, such as transistors and other semi-conductor elements, capacitors, ceramic crystals and the like.

Figures 1, 2, 3:
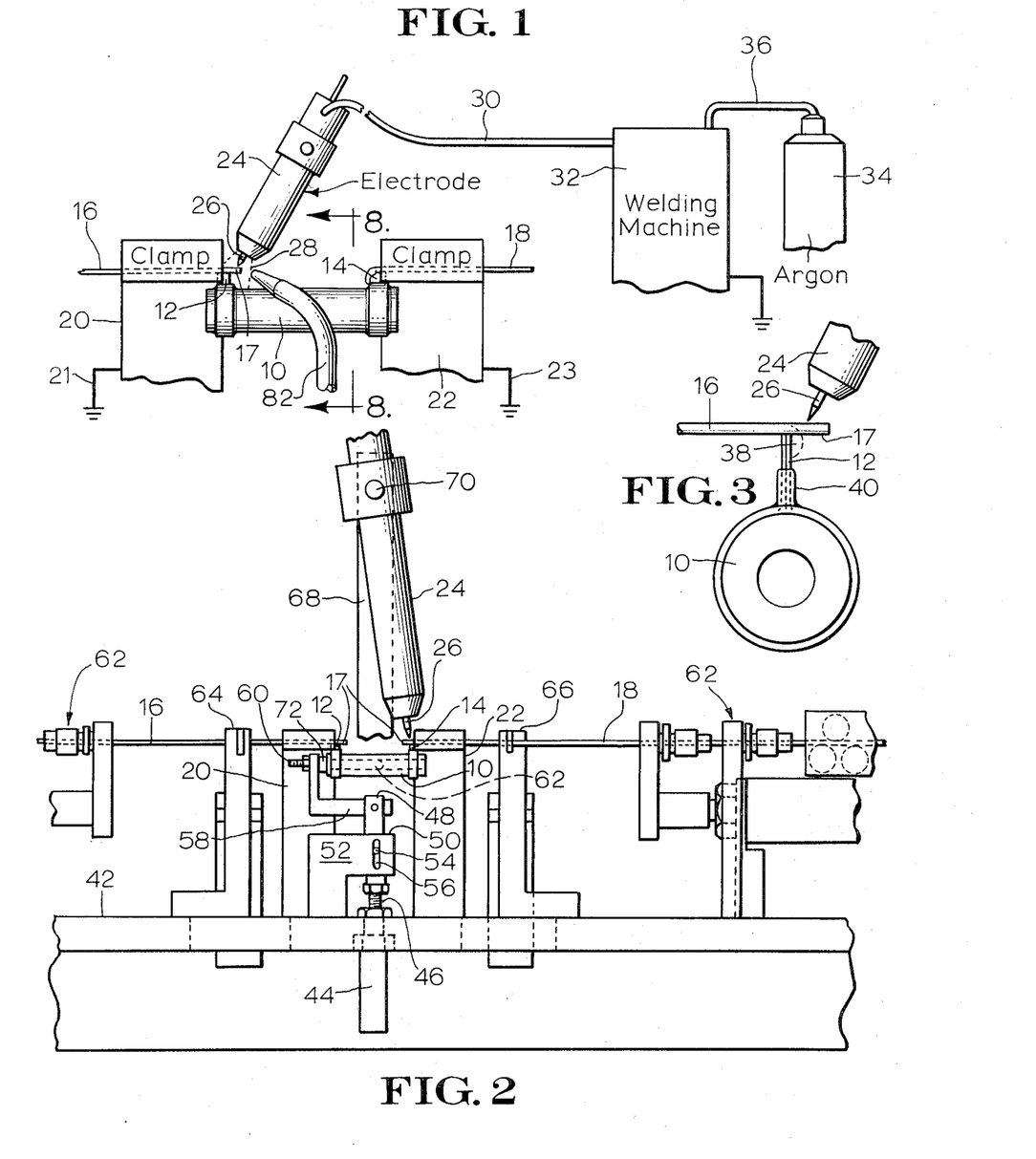
FIG. 1 is a diagrammatic illustration of the apparatus necessary to carry out the method of an embodiment of the present invention, showing an electrical component with a wire lead in the process of being welded to one terminal lug of the component, and a finished, attached wire lead on the other terminal.
FIG. 2 is a general assembly view of a welding apparatus constructed in accordance with the present invention.
FIGS. 3, 4 and 5 are illustrations of alternate procedures for locating a copper wire lead relative to the terminal lug of an electrical or electronic component in accordance with the present invention.

A resistor of the type aforementioned is designated in FIG. 1 by the numeral 10, and comprises a ceramic tube or core having a wound wire element surrounding the core. At either end of the resistor 10, terminal elements or lugs 12, 14 are suitably attached to the core of the resistor 10. The wound wire element is covered with a baked vitreous enamel coating which forms the outer insulating surface of the resistor 10. Each terminal lug 12 and 14 is connected to one end of the wire wrapped around the core, completing an electrical path from lug 12 to lug 14 through the resistor 10. In most commercially available resistors, the terminal lugs 12 and 14 are formed from a stainless steel or nickel-iron band, approximately 1/8 inch wide by 0.020 inches thick, and extend radially from the core to an extent of about 1/8 inch above the enamel covering. The melting temperature of the terminal lug is approximately 2,200° F. which is higher than the melting temperature of copper (1.980° F.).

The entire resistor 10 is coated with vitreous enamel, except for the outermost edge of each terminal lug 12 and 14. However, in the process of manufacturing the resistor, which is described in my earlier U.S. Pat. Nos. 2,460,807 and 2,479,556, the vitreous enameling operation takes place in an oxidizing atmosphere at a relatively high temperature, resulting in the formation of a heavy oxide film on the terminal elements 12 and 14. The presence of this oxide film and enamel film is ordinarily an impediment to forming a weld with the terminal lugs 12 and 14 but, as will be described in more detail, this film does not impair the operation, or adversely effect the result of the present invention.

The wire leads 16 and 18, which are to be attached to the terminal lugs 12 and 14 may be tinned copper wire, either solid or braided, usually 0.040 inch in diameter. The wire is tinned primarily due to customer requirements -i.e.: the ends of the wires 16 and 18, which are not attached to the terminal lugs 12 and 14, are prevented from oxidizing and these ends are easily soldered if tinned prior to welding. The tinning of the wires does not affect nor impede the welding process used in accordance with the present invention.

As seen in FIG. 1, the copper wires 16 and 18, are held by clamps 20 and 22, longitudinally to the body of resistor 10, and in abutment with the upper edge of the terminal lugs 12 and 14 as will be detailed with reference to FIG. 8. Clamps 20 and 22 are electrically connected to ground through wires 21 and 23, respectively. The terminus portion 17 of each wire 16 and 18 projects beyond the inner vertical edges of the terminal lug it contacts by approximately 1/8 inch. As will be explained in detail, the extension of the wire a short distance beyond the edge of the terminal lug is an important feature in the efficacious performance of the preferred embodiment of the present invention.

Located just beyond and above the junction point of the terminal lug 12 and wire 16, as seen in FIG. 1, is a welding electrode 25 having a non-consumable tungsten tip 26. A shield of inert gas 28 is emitted from the end of electrode 24, and surrounds the tungsten tip 26, the junction between wire 16 and terminal lug 12, and extending portion 17 of wire 16. A service line 30 connects electrode 24 to an electric arc welding machine 32 and a supply of inert gas 34 such as argon, which is furnished to arc welding machine 32 through tube 36. Service line 30 transmits the inert gas to the lowermost portion of electrode 24, where it is dispersed. Service line 30 also carries a supply of electrical energy to tungsten tip 26 for the purpose of striking an electric arc between tip 26 and terminus portion 17 of wire 16. Inert gas is also supplied to the inert gas shield 28 by conduit 82. The conduit 82 is preferably inclined upward slightly from a horizontal plane and receives inert gas from the supply of inert gas 34.

A typical arc welding machine, when regulated for TIG welding of wires having a diameter of approximately 0.040 inch produces a ten ampere current at 12 volts D.C. to maintain the arc. An initial charge of 70 volts is supplied to strike the arc. Depending upon the application and the different size wires to be used in practicing the present invention, the above current and voltage parameters may vary.

Welding of the wire 16 to the terminal lug 12 is accomplished by locating the tungsten tip 26 of electrode 24 at a point midway along the terminus portion 17 of wire 16, and 1/32 inch above the wire. Welding machine 32 is started and an electric arc is struck between the tungsten tip 26 and copper wire 16. The electric current is carried through the wire 16 and clamp 20 through wire 21 to ground. A shield 28 of argon surrounds the tungsten tip 26 and the work to be joined. The arc creates a heat which melts the terminus portion 17 of copper wire 16. As the wire melts, it forms a ball of molten metal 38 (FIG. 6) due to surface tension, which ball 38 travels along the terminus portion 17 of wire 16 toward the the terminus lug 12. The arc is extinguished after a time lapse of approximately ½ to 3 seconds, and the molten ball of wire coalesces with terminal lug 12.

Figure 6:
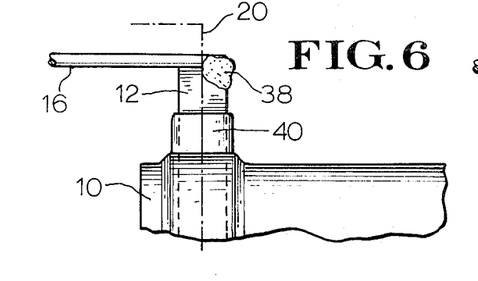
FIG. 6 is a detail view of a copper wire lead properly attached to the terminal lug of an electrical or electronic component in accordance with the preferred method forming an embodiment of the present invention.

The configuration of the final welded junction is illustrated in FIG. 6. During the welding process, the arc follows the ball of molten metal 38 until it reaches the terminal 12, at which time the terminal is heated by the arc as well as the ball of molten metal 38. The arc travels over a lateral distance of only approximately 1/16 inch, and as a result, no movement of the tungsten tip 26 is necessary during the welding process in order to enable the arc to follow the ball of molten metal.

During the welding of the lead wire 16 an amount of heat energy is applied to the welding zone which is greater than the heat energy necessary to melt the wire 16 and form the molten ball of metal 38. The excess heat energy generated by the welding arc permits contaminants in the welding zone to be burned away and allows for variation in the length of the end portion 17 of the lead wire. For example, if a larger than normal amount of the lead wire 16 extends beyond the terminal lug 12, the additional portion of the lead wire will also be melted and form part of the ball of molten metal 38 due to the excess heat energy supplied by the welding arc. The welding arc can typically be maintained for a period twice as long as the period necessary to melt an ordinary length of the lead wire 16 and thus provide twice the heat energy necessary to form the weldment. The excess energy generated in the welding process is carried away by the clamp 20 which serves as a heat sink for the lead wire 16 and the terminal lug 12. Also, the clamp 20, as shown in phantom FIG. 8, serves as a dam for maintaining the ball of molten metal 38 on the terminal lug 12 after the molten metal has become properly positioned on the terminal lug 12. If the clamp 20 did not operate to remove the excess heat energy from the welding zone, destruction of the terminal lug 12 could result.

Figure 8:
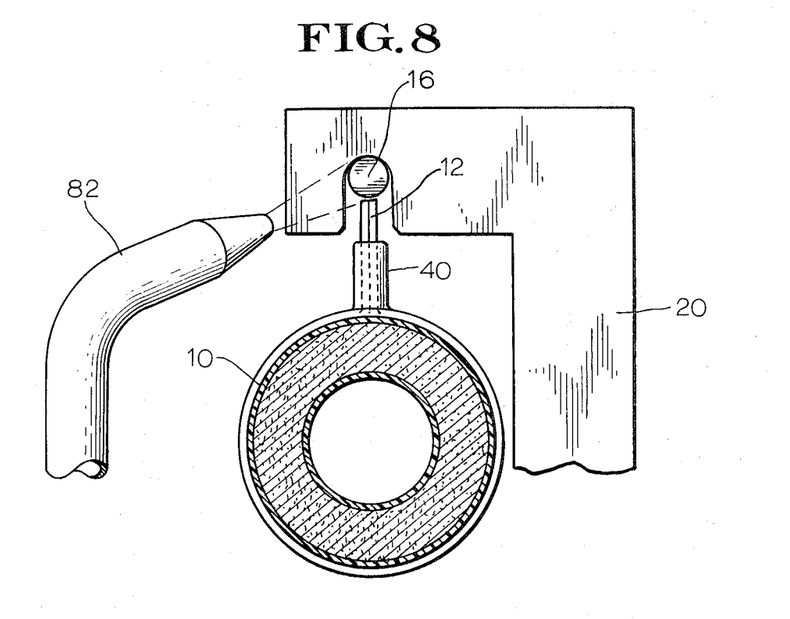
FIG. 8 is a sectional view taken along line 8—8 in FIG. 1 illustrating the manner in which the electrical component is positioned for welding.

Referring to FIG. 8, the positioning of the lead wire 16 and the terminal lug 12 within the clamp 20 is shown. The clamp 20 is in electrical contact with the lead wire 16 and holds the lead wire in an abutting position with the terminal lug 12 during the welding process.

Thus, it will be appreciated that the overheat principle utilized in the present invention in which excess heat energy is applied to the welding zone allows the welding of the wire lead 16 to the terminal lug 12 without any prior cleaning of the terminal lug. This is possible since the excess energy is effective to burn through the normally existing contaminants on the terminal lug 12. Further, it is not necessary to accurately position the lead wire 16 for welding since the excess energy generated in the welding arc will be sufficient to melt the extra length of the lead wire. The excess energy generated in the welding arc does not damage the terminal lug 12 since the clamp 20 operates as a heat sink to protect the terminal lug being welded.

It has been discovered that the inert gas discharging from the electrode 24 and traveling in a downward direction results in metal particles and other forms of soot being deposited on the resistor 10 and make it unsuitable for commercial useage. The conduit 82 discharges inert gas into the welding zone in a direction which is preferably slightly upward from a horizontal plane and combines with the gas discharged from electrode 24. The resultant inert gas flow directs the metal particles and other soot away from the resistor 10 and prevents discoloration of the resistor.

At the end of the welding process, the ball 38 of molten metal is located between the arc and the copper wire 16. Consequently, there is no deterioration in the strength of the wire since the electric arc does not strike the wire as it emerges from molten ball 38. Also, since the full mass of the wire is retained, there is no reduction in the cross-sectional area of the wire, thereby retaining the original strength of the wire. The final area of the weld is proportional to the size of molten ball 38, which in turn is a function of the length of terminus portion 17 of wire 16 projecting beyond terminal lug 12. The weld is further strengthened by the fact that there is no loss of surface area of the terminal lug 12.

The inert gas shield 28 (FIG. 1) prevents the joint from oxidizing during welding. Also, wire clamp 20 acts as a heat sink for the lead wire 16 and prevents the discoloration of the wire 16 by keeping the temperature of the wire at less than an oxidizing temperature.

As seen in FIG. 6, a portion 40 of the vitreous enamel coating of resistor 10 extends partially along the vertical extent of terminal lug 12. During welding, a portion of this coating may be melted and included within molten ball 38. Also, enamel film, oxides and other contaminants present on the exposed portion of the terminal lug 12 may be included in the molten ball 38. However, such substances, which are known to contaminate other known welded and soldered joints, do not impede the quality of the the weld formed by my invention since the oxides and inorganic contaminants are lighter than the pool of material, and flow from the weld interface to the weld surface, where they remain. In this location, the contaminants do not affect the strength or electrical characteristics of the weld, and may remain in molten mass 38 without detracting from the quality of the weld. All organic contaminants, meanwhile, vaporize under the heat produced by the arc.

The ability of the weld joint of my invention to be accomplished without prior cleaning of the terminal lugs is a decided advantage over known techniques for attaching wire leads to electrical and electronic components. When resistor 10, for example, emerges from the oven in which the vitreous enamel coat is baked, an enamel film covers the protruding portion of each terminal lug, and part of the enamel coat itself may adhere to the upper portion of the terminal lug. Using the method of the present invention, the additional step of stripping the end of the terminal lug is eliminated, thus reducing the cost of manufacture.

FIG. 2 illustrates one form of apparatus which may be used to carry out the process of the present invention. The apparatus comprises a support base 42 which is attached a vertically disposed cylinder 44. Shaft 46, which is connected to a piston movable in cylinder 44, is capable of vertical movement, under the control of suitable cylinder actuating mechanisms, not shown. Attached to the uppermost portion of shaft 46 is shaft 48 which moves vertically in vertical aperture 50 disposed in support 52. Movement of shaft 48 om aperture 50 is limited by stop pin 54, attached at one end to shaft 48, and vertically movable in slot 56 of support 52. Firmly affixed to the uppermost extent of shaft 48 is L-member 58 having a screw threaded shaft member 60 disposed in a suitably threaded slot. One end of shaft memeber 60 comprises a portion 62 which has a diameter only slightly less than that of the core of resistor 10, which is located on and held in place by shaft member 60, as will be explained.

As previously described, in connection with the diagramatic embodiment of FIG. 1, two wire clamps 20, 22, are suitably secured to base 42. Each clamp comprises two movable, slotted guides which hold the wires during welding, and operate to release the lead wires when the welding operation is completed. Wire clamps 20 and 22 hold copper wires 16 and 18, respectively, in place so that the terminus ends 17 of each copper wire 16, 18 extend beyond the terminal lugs 12 and 14 by a distance of approximately ⅛ inch. By proper actuation of cylinder 44, resistor 10 is positioned between clamps 20 and 22 such that the upper tips of terminal lugs 12 and 14 abut wires 16 and 18. However, the terminal lugs 12 and 14 need not be in electrical contact with the wires 16 and 18, respectively, since welding current only passes from the tungsten tip 26 of electrode 24 to the wires 16 and 18 during welding.

Copper wires 16 and 18 are supplied to clamps 20 and 22 from identical convetional wire straightening and feeding means 62 located on opposite sides of support base 42. Cut-off means 64, 66 are disposed between wire feed mechanisms 62 and clamps 20, 22. Cut-off means 64, 66 may be laterally positioned along support base 42 to alter the length of the lead supplied with the resistor.

Rigidly affixed to support base 42 and extending vertically therefrom is electrode support 68 to which electrode 24 is pivotally mounted about pin 70. Tungsten tip 26 is movable from a position adjacent the terminus portion 17 of wire 16 to a position adjacent the terminus portion 17 of wire 18. The electrode 24 is maintained in a pivotal position relative to support 68 such that tungsten tip 26 may be positioned approximately 1/32 inch above the terminus portion 17 of wires 16 and 18, and approximately 1/16 inch from the tips of each wire. Electrode 24 is connected to a source of electrical power and inert gas, as previously described (FIG. 1).

The operation of the welding apparatus of FIG. 2 is as follows: Shaft 46 is withdrawn into cylinder 44 by suitable control means, which in turn lowers threaded shaft member 60 as shaft 48 drops vertically in aperture 50. When pin 54 reaches the lowermost limit of slot 56, shaft 48 stops, and shaft member 60 is held in place. An operator places a vitreous enameled resistor 10 over shaft member 60, laterally locating the resistor by means of collar 72, and actuates cylinder 44 to raise resistor 10 into the position shown in FIG. 2. When lugs 12 and 14 reach and come into contact with wires 16 and 18, resistor 10 stops and is properly located.

Feeder mechanisms 62 provide a supply of wire to clamps 20 and 22, which holds the wires in position atop terminal lugs 12 and 14 of resistor 10. As stated previously, approximately ⅛ inch of wire extends beyond each terminal lug. Electrode 24 is swung into position whereby tungsten tip 26 is located above the terminus portion of either wire 16 or 18. It is important to note here that tungsten tip 26 is not located directly over terminal lug 14, but lies above a point approximately midway of the terminus portion 17 of the wire 16, 18 extending beyond terminal lug 12, 14.

The welding machine 22 (FIG. 1) is started and an electric arc is struck between tungsten tip 26 and wire 16 or 18, and a weld is formed in accordance with the procedure described, referring to FIGS. 1 and 6. After this first weld is formed, electrode 24 is swung into position such that tungsten tip 26 is located above the terminus portion 17 of the remaining unattached wire. Another arc is struck, and the welding process is repeated.

With the wires 16 and 18 now firmly attached to lugs 12 and 14 of resistor 10, cut-off means 64 and 66 are actuated to serve the copper wires at a point whereby the desired length of the wire leads is obtained. The cylinder 44 is actuated to lower shaft 46 and resistor 10 and the copper wire leads which were formed by the welding operation are released by the clamps 20 and 22. As the resistor drops below the work station, it is removed from shaft 60. A new resistor 10 is placed over shaft 60, additional wire 16, 18 is moved into place in the clamps 20 and 22, and the above-described steps are repeated. Alternatively, a pair of welding electrodes could be utilized to perform the welding of the wires 16 and 18. This would permit both wires 16 and 18 to be welded to the lugs 12 and 14 simultaneously. Also, the apparatus shown in FIG. 2 could be placed on a rotatable work table and the table could be rotated to move the apparatus and associated resistor 10 from onw work station to a second work station. The first work station could have a welding electrode 24 and associated gas supply structure for welding one of the wires 16 and 18 while the second work station could have an electrode similar to the electrode 24 as well as an associated gas supply to weld the other one of the wires 16 and 18.

The welding process described is not limited to the particular weld configuration illustrated in FIGS. 1 and 6. The copper lead wires 16 and 18 may assume different locations relative to the terminal lugs 12 and 14 to suit special requirements. In FIG. 3, for example, the wire 16 is placed across the top edge of terminal lug 12 so that the axis of wire 16 is perpendicular to the plane of the terminal lug 12 of resistor 10. The welding of wire 16 to the terminal lug 12 in the embodiment of FIG. 3 is accomplished in the same manner described in conjunction with the embodiment of FIG. 1. The tungsten tip 26 of electrode 24 is placed midway between and slightly above terminus portion 17 of copper wire 17. An electric arc is struck between tungsten tip 26 and terminus portion 17, creating a source of heat which melts the copper wire. As the wire melts, it forms a ball of molten metal 38, as previously described, which travels along the wire until it coalesces with the flat surface of terminal lug 12, at which time the arc is extinguished.

It has been found that the welding process of the embodiment of FIG. 3 is particularly suited to welding flexible leads such as made from braided or stranded copper wire to terminal lugs of resistors or other electrical or electronic components or elements. A flexible lead by its very nature is difficult to pre-form and hold in position for rapid mechanical assembly. Also, when soldering a flexible lead, the lead loses its flexibility for a considerable distance from the joint because of the capillary action of the stranded wires. The arc welding process of the present invention enables flexible copper leads to be welded to a wide variety of metals or other elements with virtually no loss of flexibility or strength.

Figure 4:
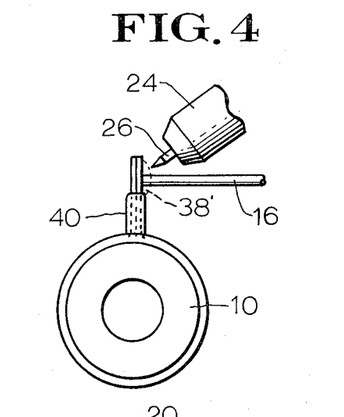

A further embodiment showing an application of the present invention is shown in FIG. 4, where the copper wire 16 is maintained under pressure against the lateral face of terminal lug 12. Tungsten tip 26 of electrode 24 is placed near the junction of the wire and terminal, and an electric arc is struck at the junction. As the heat of the arc melts wire 16, constant pressure on wire 16 forces it to feed into the junction, forming a molten mass of copper around the junction. When the arc is distinguished, the copper solidifies and coalesces with the terminal lug material, and forms a fillet of material 38' around the wire at the junction point.

Figure 5:
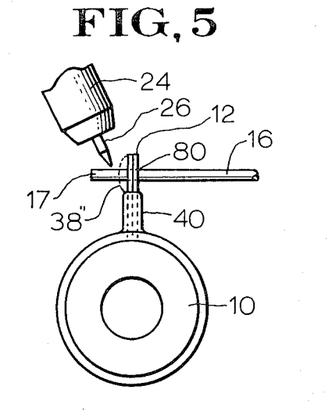

An additional embodiment of the present invention is illustrated in FIG. 5, where the terminal lug 12 comprises an aperture 80 centrally disposed therethrough. Copper lead wire 16 projects through aperture 80 such that terminus portion 17 or wire 16 extends a distance of approximately ⅛ inch beyond terminus lug 12. Electrode 24 is positioned such that tungsten tip 26 is located slightly above the midpoint of terminus portion 17. To accomplish the weld, an arc is struck between tungsten tip 26 and terminus portion 17 of wire 16, and the heat produced by the arc melts the wire back to the face of terminal lug 12. A combination ball and fillet of molten copper 38" is formed, which coalesces with the material of terminal lug 12 around aperture 80, and adheres wire 16 firmly to the terminal lug.

In the embodiments illustrated in FIGS. 3, 4, and 5, the terminal lug 12 may sometimes be made of a relatively thin material. To prevent the heat of the welding arc from burning the terminal lug, a "chill bar" may be attached to the lug. This chill bar may comprise a clamp or other solid metal object which is placed in contact with the lug and absorbs or draws away most of the heat of the arc during welding. As most of the heat is absorbed by the chill bar the terminal lug is prevented from reaching its melting point, except in the area directly adjacent the molten ball 38 where coalescing occurs.

Figure 7:
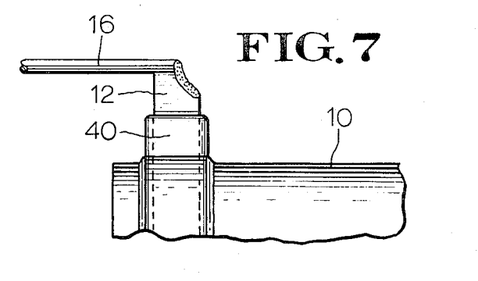
FIG. 7 is a detail view of a wire lead improperly attached to the terminal lug of an electrical or electronic component, illustrating the result achieved by not following the principles embodied in the present invention.

To achieve a strong and electrically efficient weld when employing the steps of the methods of the embodiments of FIGS. 1 and 3–5, the terminus portion 17 of copper wire 16 must extend beyond terminus 12 by a small distance, usually ⅛ inch, and the arc placed adjacent the terminus portion. FIG. 7 illustrates the damage which will result if the copper wire 16 is placed atop terminal lug 12 with the end of the wire adjacent the vertical edge of the lug 12 with no portion of the wire extending beyond the terminal lug. When so positioned, the heat of the welding arc will melt a portion of the terminal lug itself, as shown in FIG. 7, and prevent the formation of the ball of molten metal 38 (FIG. 6) which provides strength and quality to the weld with no loss of surface area of the terminal lug.

In each of the embodiments of the present invention, heat for welding is generated by an electric arc generated from the tungsten tip 26 of electrode 24 to the lead wire 16 or 18. Clamps 20 and 22, and ground wires 21 and 23 complete a path for the conduction of the electric current. No electrical connection need be made to the terminals 12, 14, as opposed to resistance welding where electrical connections must be made to both the wire and the terminal. Further, the present invention, with the exception of the embodiment illustrated in FIG. 4, relates to a welding method and apparatus whereby one part to be welded is merely in contact with the other part, and no pressure is applied. This differs with previously known welding techniques where there must be some degree of pressure between parts for forming a proper junction. A further advantage of the present invention with the exception of the embodiment disclosed in FIG. 4, is that the copper wire and terminal lug remain stationary during welding, while some known welding techniques require that the wire must be moved, under pressure, into the junction.

The butt welding technique of the present invention, illustrated in FIG. 4, has decided advantages over known butt or percussion welding methods. In usual percussion welding methods, the electrical current from the arc must pass through the terminal lug and the wire, and a connection must be made to the terminal. In the case of small terminal lugs, as are present in most electrical or electronic components, this presents a severe limitation on the configuration of weld which can be used. No shielding gas is used in percussion welding, requiring that the junction must be free of contaminants. This results in an extra production step which is eliminated in the present invention. Using my butt welding process (FIG. 4), electrical current need only pass through the wire, and not the terminal, which is usually small and difficult to connect to an electrical conductor for welding. Also, as previously explained, the terminal need not be cleaned prior to welding.

My invention may also utilize the metal inert gas welding technique (MIG welding) to produce an electrical or electronic component having a copper wire lead welded thereto. Metal inert gas welding is similar to tungsten inert gas welding (TIG welding) except that the electrode comprises a filler metal (copper in the present case) which is consumed as the electric arc melts the electrode. Using MIG welding methods in the butt welding process of FIG. 4, the wire 16 becomes the consumable electrode. In this application, electrical connections must be made to both the wire and the terminal. After striking the arc, the wire is fed into the junction at a rate greater than it is consumed, thereby extinguishing itself and coalescing.

The foregoing embodiments are exemplary of the process, product and apparatus of the disclosed invention, and may be used as a model for constructing the invention. However, many variations of the disclosed device may be made without departing from the spirit and scope of the invention as defined in the following claims.

What is claimed is:

1. A method of welding a lead wire to a terminal lug of an electronic component, said terminal lug having contaminants thereon, comprising the steps of:
positioning the lead wire in an abutting relationship with the terminal lug of the electronic component, an end portion of the lead wire extending beyond said terminal lug a predetermined amount;
shielding a welding zone formed by the lead wire and the terminal lug of the electronic component with an inert gas;
generating a welding arc between the end portion of the lead wire and a welding electrode to form a ball of molten material on the lead wire;
maintaining the welding arc for a period substantially greater than the period necessary to form a coalesced mass of molten material from the lead wire and the terminal lug of the electronic component in order to produce an excess of heat energy in the welding zone and burn away the contaminants on the terminal lug; and
carrying away from the lead wire and the terminal lug of the electronic component excess heat energy produced in the welding zone.

2. The method of Claim 1 further including the step of:
forming a dam on the lead wire and the terminal lug of the electronic component to contain the coalesced mass of molten material in position on the terminal lug of the electronic component.

3. The method of claim 2 wherein the step of shielding the welding zone with inert gas includes the steps of:
discharging inert gas downward from the electorde to the welding zone and discharging inert gas in a substantially horizontal direction into said welding zone whereby the resultant flow of inert gas exiting the welding zone is directed away from the electronic component being welded.

4. The method of claim 3 wherein the welding arc is maintained for a period of time approximately twice the period of time necessary for forming the coalesced mass of molten material from the lead wire and the terminal lug.

5. A method of welding a lead wire to the terminal lug of an electronic component such as a resistor, said terminal lug having contaminants thereon, comprising the steps of:
positioning the terminal lug of the electronic component in an abutting relationship with the lead wire, and end portion of the lead wire extending beyond the terminal lug of the electronic component a predetermined amount;
positioning a clamp on the lead wire and the terminal lug of the electronic component, said clamp being in electrical contact with the lead wire;
shielding a welding zone formed by the lead wire and the terminal lug of the electronic component with an inert gas;
generating a welding arc between the end portion of the lead wire and the welding electrode to form a molten ball of material from said lead wire, said molten ball of material heating the terminal lug;
maintaining the welding arc for a period of time substantially greater than the period of time necessary to form a mass of molten material from the lead wire and the terminal lug of the electronic component in order to produce excess heat energy in the welding zone and burn away the contaminants on the terminal lug; and
carrying away from the lead wire and the terminal lug of the electronic component through said clamp the excess heat energy formed in the welding zone.

6. The method of claim 4 wherein the welding arc is maintained for a period of time approximately twice the period of time necessary for forming the mass of molten material from the lead wire and the terminal lug.

* * * * *

UNITED STATES PATENT OFFICE
CERTIFICATE OF CORRECTION

Patent No. 3,795,786　　　　　　　Dated March 5, 1974

Inventor(s) HARRY CHANOWITZ

It is certified that error appears in the above-identified patent and that said Letters Patent are hereby corrected as shown below:

Column 2, line 25　　　　　"he" should read --the--.

Column 2, line 28　　　　　"publication" should be --application--.

Column 2, line 30　　　　　"method" should read --methods--.

Column 6, line 7　　　　　"1.980°F" should read --1,980°F--.

Column 6, line 46　　　　　"25" should read --24--.

Column 8, line 13　　　　　"useage" should read --usage--.

Column 10, line 16　　　　"22" should read --32--.

Column 10, line 63　　　　"17" should read --16--.

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents